(No Model.)

T. B. JEFFERY.
WHEEL TIRE AND FELLY.

No. 603,956. Patented May 10, 1898.

Witnesses
Wm. F. Henning
Ray A. White.

Inventor
Thomas B. Jeffery
by Walter H. Chamberlin
Atty.

UNITED STATES PATENT OFFICE.

THOMAS B. JEFFERY, OF CHICAGO, ILLINOIS.

WHEEL TIRE AND FELLY.

SPECIFICATION forming part of Letters Patent No. 603,956, dated May 10, 1898.

Application filed November 14, 1894. Serial No. 528,706. (No model.)

*To all whom it may concern:*

Be it known that I, THOMAS B. JEFFERY, a citizen of the United States, residing at Chicago, county of Cook, State of Illinois, have invented a certain new and useful Improvement in Wheel Tires and Fellies; and I declare the following to be a full, clear, and exact description of the invention, such as will enable others skilled in the art to which it pertains to make and use the same, reference being had to the accompanying drawings, which form a part of this specification.

My invention has for its object the production of a wheel-rim and pneumatic or inflatable tire of that class in which the outer or surrounding tube of the tire has two free meeting edges which are engaged to the rim by interlocking flanges, the outer sheath or tube being held to the rim by the contained air-pressure of the inner tube. In this class of tire the inner tube exerts such a pressure on the outer sheath as to tend to separate the edges of the outer sheath which are engaged to the rim, and consequently a heavy lateral strain is thrown upon the rim, which tends to either split the rim at its middle or else split either or both of the interlocking flanges. To lessen or obviate this tendency to split is the object of my invention, which consists in a combination of devices hereinafter explained and claimed.

Figure 1:
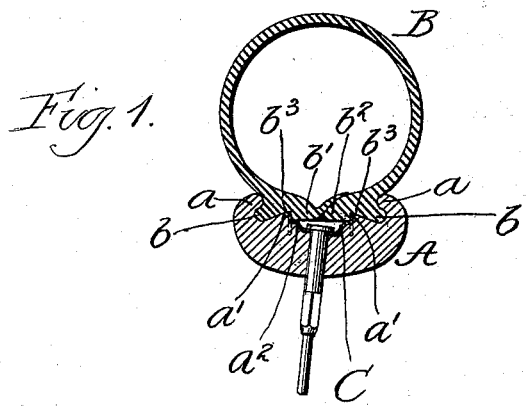
Figure 2:
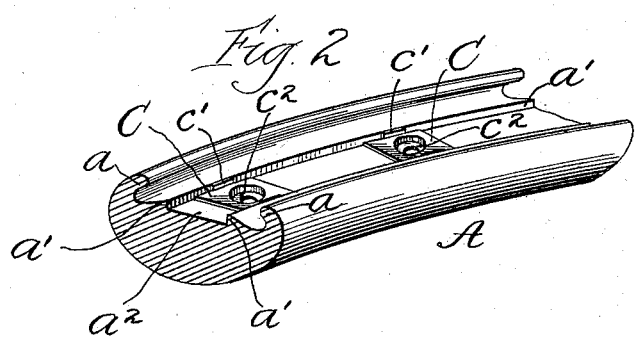
Figure 3:
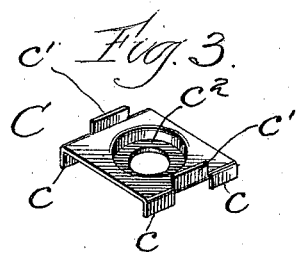

In the drawings, Figure 1 is a cross-section of a rim and tire embodying my invention. Fig. 2 is a perspective view of a section of the rim. Fig. 3 is a detail of the metallic washer.

In carrying out the invention A represents a rim, preferably made of wood, and B the outer sheath of a pneumatic tire. On each edge of the rim and on the convex side thereof is an interlocking flange $a$, and on each edge $b'$ $b^2$ of the outer sheath B and extending substantially parallel with each edge is a corresponding interlocking flange $b$, adapted when the inner tube of the tire is inflated to interlock with the flange $a$ on the rim, and thus engage and hold the sheath to the rim. On each edge of the rim, extending parallel with each flange $a$, is an additional flange $a'$, and on each edge of the sheath B, between the flanges $b$ and the edge proper, is an additional flange $b^3$, adapted to engage the flange $a'$ on the rim. A depression $a^2$ will of course be left between these flanges $a'$. It will thus be seen that by the provision of the flanges $a'$ on the rim and the corresponding flanges $b^3$ on the sheath B, in addition to the flanges $a$ $b$, the strain on the rim is distributed throughout the width of the latter. As this strain is almost entirely a lateral strain with respect to the face of the rim and as the flanges $a'$ are located nearer the middle of the rim and at the thicker part of the rim the strain on the outer flanges $a$ is to a very large extent relieved and the tendency of the edges $b'$ $b^2$ of the sheath to separate when the inner tube is inflated is met.

C represents a series of metallic washers which I may employ, if desired, to form seats for the spoke-head. These washers are shaped, as shown in Fig. 3, with the corners turned down, as at $c$, with the side edges turned up, as at $c'$, and with a countersunk portion $c^2$, in which the spoke-head rests. By the provision of this washer the strain of the spoke on the rim (which because of the small area of the spoke-head and the large number of perforations in the rim tends to split the rim longitudinally) is distributed over a greater area and the liability of splitting reduced to a minimum.

It will be observed that the construction and arrangement of the several parts are such that the full lateral pressure of the contained air (which is essential in a tire of this character to prevent longitudinal movement between the tire and rim) is resisted by this form of rim, and firm mutual interlocking action results.

While I have herein described the invention as applied to a wood rim, yet it is obvious that the invention might also be applied to a rim of any other material.

Again, I would have it clearly understood that my present invention, except in the provision of the metallic washers, relates entirely to that class of tires and rims in which the outer or surrounding sheath has free edges, which are engaged to the rim by the interlocking flanges and the latter held in place by the contained air-pressure of the inner tube. This construction is in contradistinction to that class of tires in which the tire or outer sheath is integrally cylindrical when attached to the rim or is made practically cylindrical by cementing the meeting edges of the sheath together or locking them together by cementing on what might be termed a "locking-strip." In a construction such as just described after the locking-strip has been cemented on there is no later bursting-pressure brought upon the interlocking flanges, because the meeting edges are not free to expand or separate from each other, and consequently there is no necessity of the additional flanges on the rim and tire.

What I claim is—

1. A tire of flexible material having separable edges and provided on its exterior convex surface and near each edge with two parallel ribs or projections, substantially as described.

2. The combination of the rim provided with a circumferential recess having in each of its walls or sides two channels, the transverse distance between the sides of the inner channels nearest the axis of the wheel being less than the transverse distance between the sides of the outer channels, and a tire-sheath of flexible material provided with ribs adapted to be seated in said channels and held there by the air-pressure of the inner tube, substantially as described.

3. The combination of an annular tire-sheath of flexible material having near each of its edges two parallel ribs or projections, and a wheel-rim having a recess with its walls grooved and channeled to receive said ribs, the ribs on said sheath adapted to be held to their respective seats in said channels by the pressure of the inner tube, substantially as described.

4. The combination with a tire-sheath provided on its exterior surface and adjacent to each edge with two parallel ribs or flanges, one rounded in cross-section and the other angular in cross-section, of the rim provided on its convex face with channels adapted to receive said ribs the said sheath held to the rim by the pressure of the inner tube, substantially as described.

5. The combination with the rim having a series of spoke perforations, of a washer on the tire-face of the rim surrounding a spoke perforation and against which the spoke-head directly bears, said washer having upward projections which engage the base of the tire-sheath, substantially as described.

6. The combination with the rim having a series of spoke perforations of a substantially rectangular washer on the tire-face of the rim, said washer provided with prongs for engaging it to the face of the rim and with upward projections to engage to the tire, substantially as described.

In testimony whereof I sign this specification in the presence of two witnesses.

THOMAS B. JEFFERY.

Witnesses:
W. H. CHAMBERLIN,
FLORENCE KING.